United States Patent [19]
Perez-Lopez

[11] Patent Number: 6,036,599
[45] Date of Patent: Mar. 14, 2000

[54] CROP PROCESSING ARRANGEMENT

[75] Inventor: Antonio Perez-Lopez, Contwig, Germany

[73] Assignee: Deere & Company, Moline, Ill.

[21] Appl. No.: 09/033,354

[22] Filed: Mar. 2, 1998

[30] Foreign Application Priority Data

Mar. 7, 1997 [DE] Germany ............ 197 09 398

[51] Int. Cl.⁷ .................................. A01F 12/30
[52] U.S. Cl. ................ 460/85; 460/113; 460/73
[58] Field of Search ................ 460/85, 73, 74, 460/84, 87, 88, 89, 113, 59

[56] References Cited

U.S. PATENT DOCUMENTS

| | | | |
|---|---|---|---|
| 1,116,113 | 11/1914 | Piper ............................................ | 460/88 |
| 2,706,032 | 4/1955 | Kovalik . | |
| 3,049,129 | 8/1962 | Mark et al. .................................. | 460/85 |
| 3,593,719 | 7/1971 | Ashton ........................................ | 460/73 |
| 3,940,911 | 3/1976 | Schmitt ....................................... | 460/85 |
| 4,170,235 | 10/1979 | Ashton et al. .............................. | 460/73 |
| 5,036,653 | 8/1991 | Klinner ....................................... | 460/73 |
| 5,395,287 | 3/1995 | Coers .......................................... | 460/113 |
| 5,685,773 | 11/1997 | Meester et al. ............................. | 460/113 |

FOREIGN PATENT DOCUMENTS

| | | |
|---|---|---|
| 698324 | 10/1953 | European Pat. Off. . |
| 567192 | 10/1993 | European Pat. Off. . |
| 1473891 | 3/1967 | France . |
| 2029698 | 10/1970 | France . |
| 2075322 | 9/1971 | France . |
| 2222009 | 3/1974 | France . |
| 2232911 | 5/1974 | France . |
| 2342022 | 2/1976 | France . |
| 2304275 | 3/1976 | France . |
| 1582412 | 6/1970 | Germany . |
| 1904406 | 5/1972 | Germany . |
| 2103981 | 2/1974 | Germany . |
| 2419268 | 11/1975 | Germany . |
| 2431588 | 2/1976 | Germany . |
| 2512150 | 10/1976 | Germany . |
| 2235061 | 11/1977 | Germany . |
| 2808913 | 9/1978 | Germany ................................. 460/89 |
| 3211177 | 10/1982 | Germany . |
| 3621995 | 1/1988 | Germany . |
| 4127118 | 2/1993 | Germany . |
| 4209020 | 9/1993 | Germany ................................. 460/85 |
| 4209020 | 4/1996 | Germany . |
| 1259734 | 1/1972 | United Kingdom ..................... 460/85 |
| 2095964 | 10/1982 | United Kingdom . |

*Primary Examiner*—Thomas B. Will
*Assistant Examiner*—Arpad Fabian Kovacs

[57] ABSTRACT

A crop processing arrangement (28) is proposed with a cylindrical rotor housing (42), an eccentric axle (44) rotatively supported in bearings therein and tines (46) rotatively supported in bearings on the eccentric axle (44). The transverse inclination of the tines can be varied by shifting the axial position of the eccentric axle relative to the cylindrical rotor housing. In this way a loosening and sideways movement of the crop conveyed by the tines (46) is attained with a relatively simple mechanism.

15 Claims, 6 Drawing Sheets

CROP PROCESSING ARRANGEMENT

BACKGROUND

1. Field of the Invention

The invention is directed to a crop processing arrangement comprising a transversely arranged cylindrical rotor housing, a transversely arranged eccentric axle rotatively supported in bearings in the rotor housing, tines rotatively supported in bearings on the eccentric axle and projecting through the rotor housing, and a control arrangement for axially moving the eccentric axle relative to the rotor housing for controlling the transverse inclination of the tines relative to the eccentric axle and rotor housing.

2. Description of the Prior Art

DE-OS-1 904 406 discloses a combine with a tine-equipped rotor operating as an undershot conveyor located above straw walkers. This tine-equipped rotor is composed of a rotor housing, an axle supported eccentrically in bearings therein and tines rotatively supported in bearings on the axle extending through the wall of the rotor housing. During rotation of the rotor housing the tines projecting to the greatest amount at the bottom of the rotor housing are moved longitudinally in the direction of conveying the crop material from the threshing assembly to the straw walkers. The tines tear apart the mat of straw increasing in the separation of kernels still retained in the straw. To increase the rate of separation the tines are either fastened to the axle through wobble plates or the axle is constantly moved axially by means of an eccentric-drive motor. In this way the free ends of the tines also move in the axial direction of the rotor and further tear apart the straw mat.

DE-OS-22 35 061 discloses a combine in which an overshot conveyor similar to a pick-up platform is located between straw walkers and straw hood. The overshot conveyor takes up straw and redelivers it further downstream. The short straw lying at the bottom of the straw mat can then be separated. The overshot conveyor can also be provided immediately following a walker. A similar arrangement is also known from FR-PS-1,473,891 and DE-AS-2 103 981, where the arrangement according to the latter named citation can additionally be brought into a non-operating position.

According to GB-PS-698, 324 an overshot conveyor is also provided above straw walkers that consists of a drum and on which toothed strips are mounted in the trailing direction.

DE-OS-2 431 588 teaches a separator in the delivery region of the threshing assembly of a combine, that is provided with movable or flexible tines supported on a rotor which perform undershot conveying of the crop material. The tines are flexible, but always extend with their full length into the crop. It is also proposed that several such separators be arranged one after another.

According to DE-C3-42 09 020 a separator drum operating as an overhead conveyor is inserted between a threshing assembly and the straw walkers which catches the threshed crop coming from the threshing assembly and decelerates it so that kernels contained in the mass of the crop are deposited on the surface of the separator drum while the straw is passed along to the straw walkers.

DE-A1-41 27 118 shows a combine with straw walkers and a crop processing arrangement located above the walkers, which performs undershot conveying of the crop. Ahead of the crop processing arrangement a belt of tines is provided that also performs undershot conveying which tears apart the mass of crop and throws it at high speed into the slot between the crop processing arrangement and the straw walkers.

SUMMARY

It is one of the objects of the present invention to provide a simple assembly for changing the transverse angle of inclination of the tines relative to the cylindrical rotor housing and the eccentric axle.

By transversely inclining the tines relative to the cylindrical rotor housing and the eccentric axle, the free ends of the tines are moved axially during rotation of the cylindrical rotor housing, despite the fact that the eccentric axle is fixed in the axial direction and the inner ends of the tines are attached to the eccentric axle. This remains true as long as the tines are not oriented radially, that is perpendicular to the eccentric axle. The tines need to be transversely inclined to the axis of rotation. This pivoting movement is based on the fact that due to the relative radial movement of the axle in the interior of the rotor housing, the angles of a triangle between the attaching joint of the tine at the axle, its exit point in the rotor housing and a radial line through the exit point varies continuously. Thereby it can be seen that with the uncomplicated design of the present invention, axial movement of the free ends of the tines can be achieved without wobble plates and without an axial movement of the axle. The axial movement of the free ends of the tines imparts a sideways movement on the crop material. Accordingly a considerable cost reduction and improvement in reliability is attained compared to other known configurations. The present processing arrangement makes it possible to perform a sideways movement of the crop by a corresponding inclination of the tines, that is, the position of the axial position of the eccentric axle relative to the cylindrical rotor housing, so that an accumulation of crop material on one side of the combine, during operation on a side slope, can be avoided or reduced.

In undershot conveying by the present crop processing arrangement, a housing or a chute located opposite the arrangement, for example, a walker lining, offer a contact surface for the crop being conveyed by providing an opposing bearing surface for the tines, so that the crop mat is torn open all the more. In contrast to known arrangements, the present invention provides better quality straw, since the sideways movement is not as intense.

In overshot conveying the crop is loosened further while it is protected even more, which results in a still better separation in most crops.

If the tines are arranged in rows with differing bearing locations that are offset with respect to each other on the eccentric axle or in the surrounding wall of the rotor housing, then the tines are arranged so as to cross one another on the rotor housing, which pulls the crop apart followed by a compression, that further enhances the separating performance.

If the position of the tines can be varied in the radial as well as the circumferential direction, better compliance with the particular requirements encountered or the conveying conditions is possible. By changing the radial position the aggressiveness of the tines in conveying can be varied.

The inclination of the tines can be changed very simply by supporting one part of the eccentric axle in bearings in its other part so that it can move axially, where both are appropriately configured as angle levers, which determine the eccentricity of the axle.

According to another embodiment, the axle may also be designed as a one-piece component and moved axially as a unit through or in two bearings. This configuration is even less costly and can be applied where there is sufficient space.

For the repositioning of the inclination of the tines a control arrangement is provided which positions the axle and thereby the tines either continuously or in steps, this can be performed by remote control as well as directly by manual operation. If a control or regulating arrangement is used, the composition of the crop and/or its distribution on the conveying chute can be selected as an indicator for the requirement of a change in the inclination of the tines.

Among the multiplicity of applications of this crop processing arrangement those offered in a combine are particularly favorable since there a high separation performance is required.

The location of a crop processing arrangement between a threshing assembly and straw walkers in a combine has the effect of avoiding or removing an accumulation on one side, which is all the more advantageous since this is the earliest possible point in time behind the threshing assembly for this purpose. Thereby any negative consequences in the further course of the crop are reduced.

The location of the crop processing arrangement ahead of the straw walkers, that is, immediately downstream from the beater, may be selected in such a way that it strips the crop directly from the beater and thereby prevents any undesirable wrapping on the beater.

A further cost reduction is attained if the crop processing arrangement replaces the conventional beater in a combine. This is possible due to the excellent conveying performance of the crop processing arrangement, and as an added advantage the crop can also be moved sideways.

In order to counteract an uneven distribution of the crop at an even earlier point in time, the crop processing arrangement may be located in the intake region of the feederhouse thereby providing a uniform distribution of crop material across the width of the feederhouse immediately upstream from the threshing assembly.

The axial movement in an auger that collects the harvested crop in a cutting head, a pick-up or the like is enhanced by the crop processing arrangement according to the invention, since it acts as a supplement to the screw helices.

The flow of the crop from the threshing assembly to the straw walkers if in this region two rotor housings with tines operate in opposite directions.

DETAILED DESCRIPTION

Figure 1:
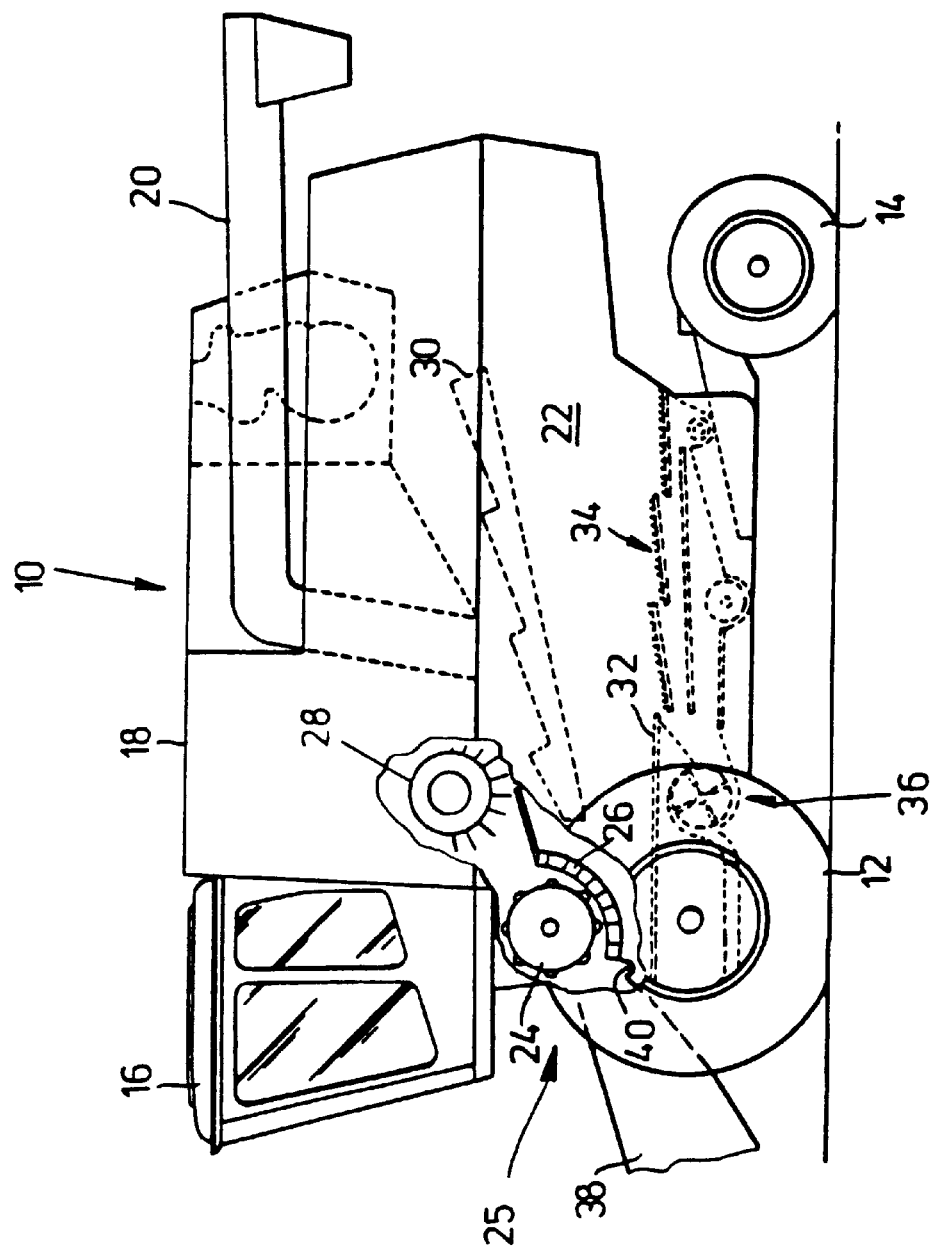
FIG. 1 is a partial cross sectional side view of a combine.

A harvesting machine 10 in the form of a combine, shown in FIG. 1, is supported on front driven and rear steerable wheels 12 and 14, respectively. The combine is provided with an operator's cab 16 from which an operator controls the combine. In place of a combine a stationary threshing machine, an experimental thresher installation or the like could be considered. Located to the rear of the operator's cab 16 is a grain tank 18 for temporarily storing clean grain. The clean grain is removed from the grain tank 18 by a discharge auger 20. The grain tank 18 is supported on a frame 22. Harvested crop material is directed past stone trap 40 and into the frame by feederhouse 38. The harvested crop material is separated into its large and small components by a threshing cylinder 24 and a threshing concave 26, which together form a threshing assembly 25, and a crop processing arrangement 28. Further separation of the harvested crop is performed on straw walkers 30 located downstream from the threshing assembly and the crop processing arrangement as well as on a preparation chute 32 and sieves 34 until finally the clean grain is conveyed into the grain tank 18. The large components of the crop material are deposited on the ground from the straw walkers 30 and light components of the crop material are blown by means of a blower 36 from the sieves 34 also onto the ground.

Figure 2:
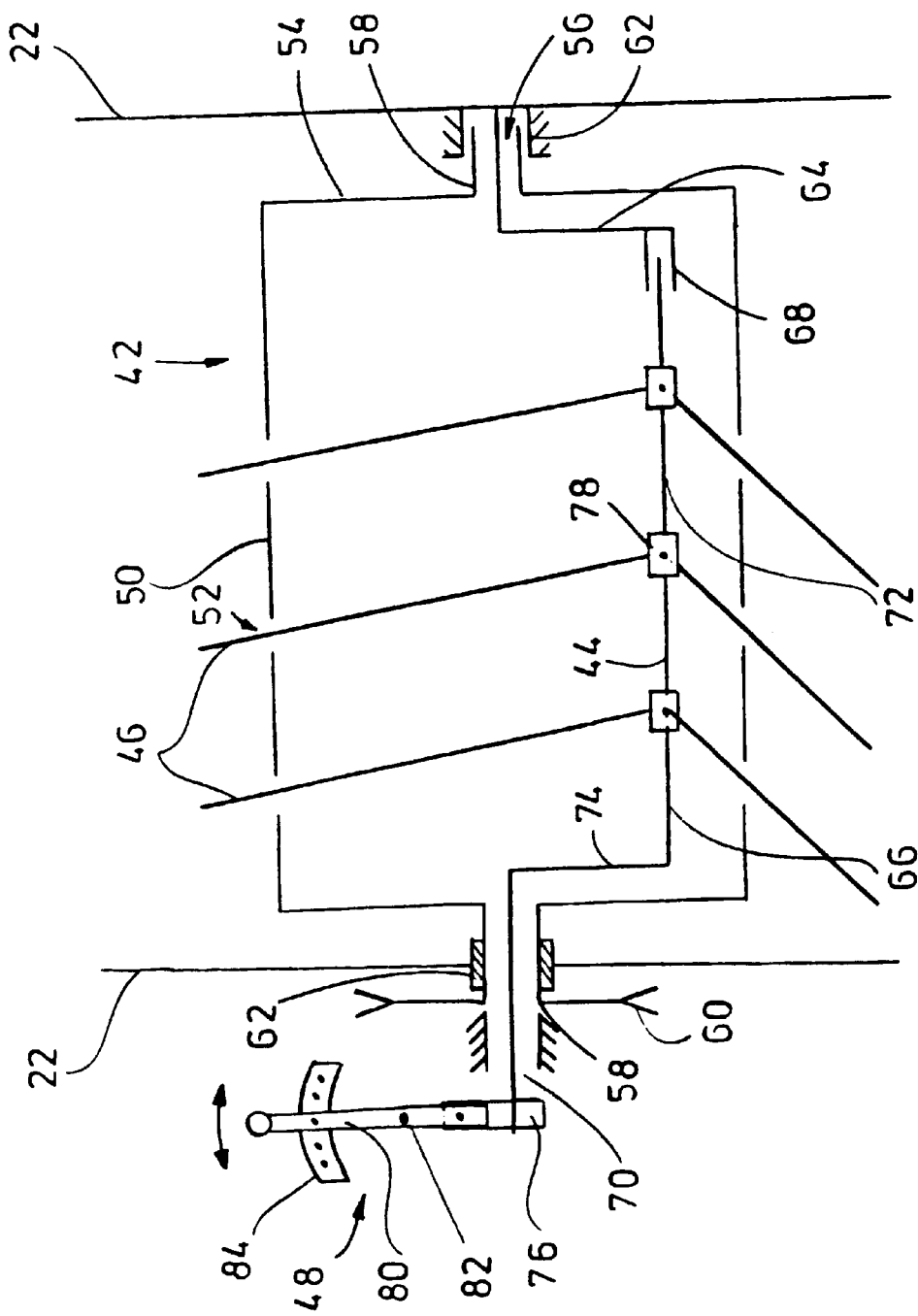
FIG. 2 is a schematic view of the crop processing arrangement according to the first embodiment of the present invention.

The following description is essentially directed at FIG. 2 which shows the crop processing arrangement according to the invention in greater detail. The crop processing arrangement 28 contains a cylindrical rotor housing 42, an eccentric axle 44, tines 46 and a control arrangement 48.

The rotor housing 42 is provided with a cylindrical wall 50, and which is equipped with a number of openings 52 arranged in rows and corresponding to the number of tines 46. The tines 46 are axially spaced from each other. Openings 52 are equipped with bearing balls, not shown, that make possible a pivoting movement of the tines 46 in the cylindrical wall 50. The end faces of the cylindrical wall 50 are provided with enclosing end walls 54. The center of each end wall is provided with a bearing 56 in the form of a penetration opening along with a bearing neck 58. At the left bearing neck 58, as seen in the drawing, a drive pulley 60 is fixedly attached, through which the rotor housing 42 can be rotated by means of a belt, not shown. Obviously the drive may also be performed by other means, for example, by means of a hydraulic motor, a chain, a drive gear on the cylindrical wall 50, etc. The bearings 56 provide bearing support for the axle 44 in the end walls 54. The rotor housing 42 is supported through the bearing necks 58 on the bearings 62 in the frame 22 of the combine 10. However, the bearing support can also be performed in other ways.

The axle 44 is composed of a first and second angle lever 64 and 66, which can be fixed in a certain position with respect to the frame 22. This position can be varied in known manner. In the configuration illustrated in FIG. 2, the first angle lever 64 is retained axially and radially in the right bearing 56, and it can be rotated therein if necessary to vary its position. At the end of the first angle lever 64 that faces away from the bearing 56 the first angle lever 64 ends as sleeve 68. The second angle lever 66 is rotatively supported in bearings and is movable axially. The first angle lever 64 ends as closely as possible to its associated end wall 54, so that sleeve 68 is relatively short. The second angle lever 66 is composed of a section 70 extending outward through the bearing 56 and a section 72 carrying the tines 46, which are connected to each other by a radial section 74. As illustrated in FIG. 2, the second angle lever 66 is rotatively supported and fixed axially in bearings with the free end of the section 72 in the sleeve 68 and with the section 70 in the bearing 56. The section 70 is connected by a coupling 76 to the control arrangement 48 through which it and therewith the entire second angle lever 66 are secured against rotation. Distributed over the length of the section 72 are several tine retainers 78 which are fixed axially thereon but are also free to rotate. The tine retainers 78 are so configured that the tines 46 can pivot in a radial plane through the longitudinal axis of the section 72. Each tine 46 is preferably associated with its own tine retainer 78.

The tines 46 are preferably configured as straight-line elements, but may also be arranged as trailing in the direction of rotation. In any case the tines 46 are longer than the greatest distance between the axle 44 and the opening 52 in the cylindrical wall 50. The tines 46 are supported in bearings at one end in the tine retainers 78 and at their other ends, in the cylindrical wall 50, in each case the tines are free to pivot. In view of this bearing support of the tines 46 and the possibility of shifting the section 74 of the axle 44 or the entire axle 44 axially, the tines 46 may be inclined at differing angles with respect to the cylindrical wall 50. It can be seen and is otherwise known that on the basis of the eccentric position of the section 74 with respect to the rotor housing 42, the tines 46 project to differing amounts beyond the cylindrical wall 50, and thereby engage to differing degrees with the crop material to be conveyed.

The tines 46 are normally configured as rigid fingers. However, the employment of flexible tines is also possible.

Figure 3:
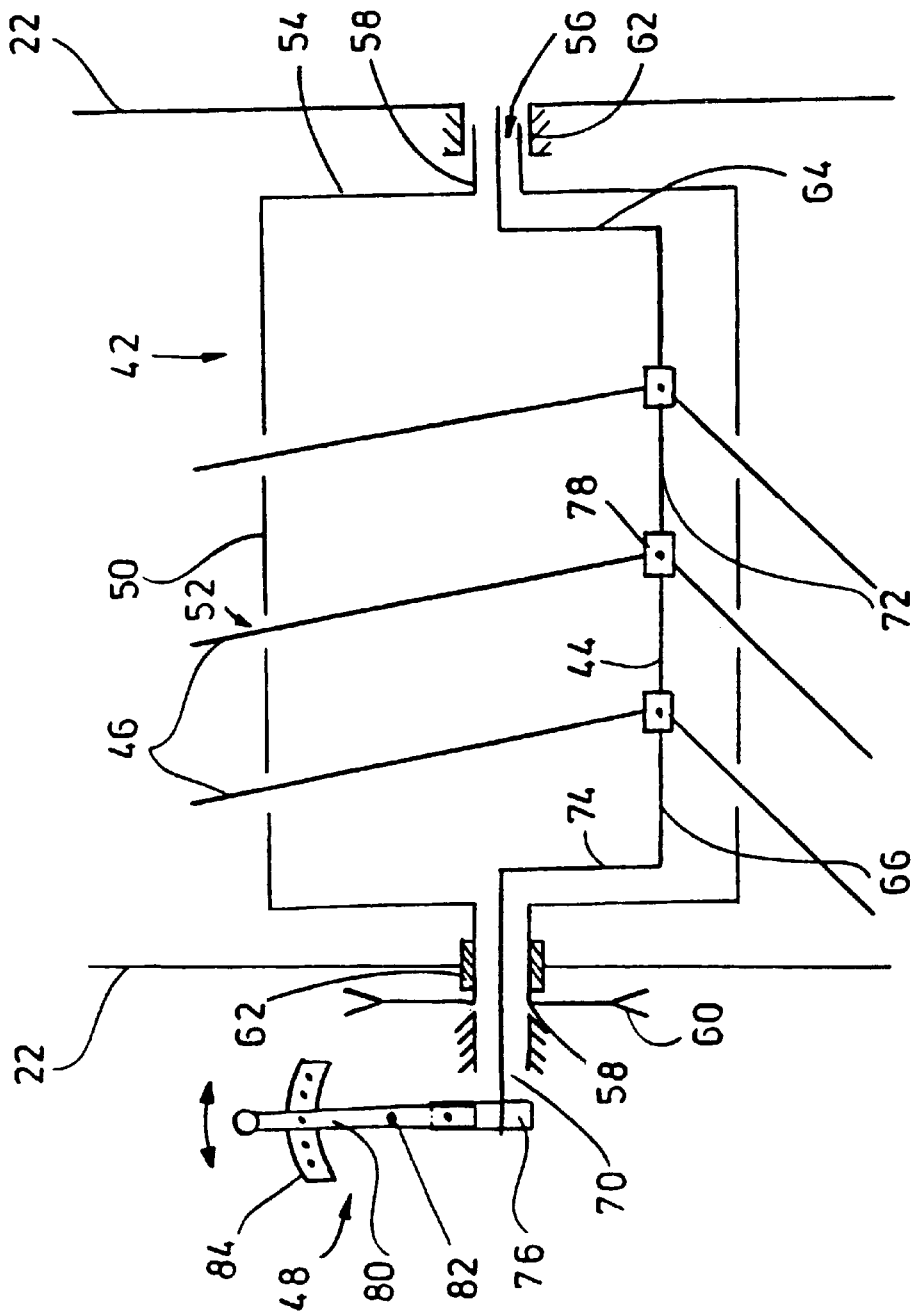
FIG. 3 shows a schematic view of the crop processing arrangement according to the second embodiment of the present invention.

FIG. 3 shows the second embodiment of the crop processing arrangement 28, which differs only slightly from that shown in FIG. 2 in that the two angle levers 64 and 66 are rigidly connected to each other instead of being axially movable, and that the angle lever 64 is supported and axially moveable in bearings, in the bearing neck 58 or in the frame 22. Accordingly in this embodiment, the axle 44 is formed essentially by a carrier bent in four places, and can be moved axially as a unit.

The axial position of the section 74 or the entire axle 44 is determined by means of the control arrangement 48. The control arrangement 48 changes the axial position of eccentric axle 44 either continuously or in steps. In any case the position is changed only by a new repositioning, while it remains unchanged during operation. The control arrangement 48 contains a control lever 80 which can be pivoted about an axis 82 and can be secured with one end to a control segment 84, while its other end engages the coupling 76. If the control lever 80 is released from a detent or the like, not shown, on the control segment 84, it can pivot about the axis 82 and reposition axially the coupling 76 together with the entire axle 44. Obviously, another control arrangement 48 can be employed, for example, a servo motor, a rope pull, a linkage or a similar control device operated manually or by a motor.

As could be seen from FIG. 2, the transverse inclination of the tines 46 depends on the axial distance between the tine retainers 78 and the openings 52. This means that during the rotation of the cylindrical wall 50 the tines 46 also rotate about eccentric axle 44, a permanent change in the angle of the tines 46 takes place. This change in angle is transmitted by the part of each tine 46 that projects beyond the cylindrical wall 50 to the crop located under it and moves the latter so that kernels contained therein can be released. Since the change in angle remains constant in amount and direction at a selected position of the control arrangement 48, a sideways movement of the crop also takes place depending on the amount of the axial offset.

Figure 4:
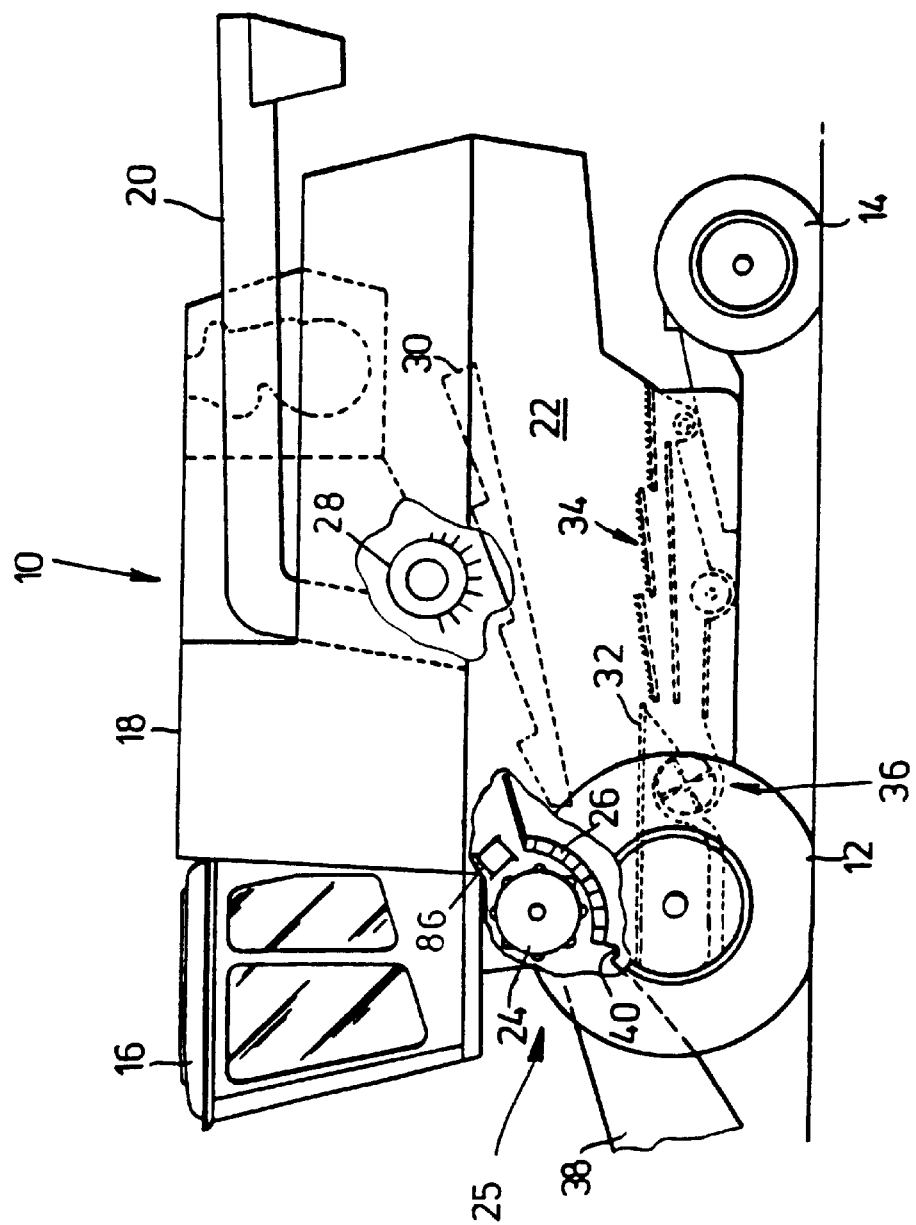
FIG. 4 shows the crop processing arrangement installed in the harvesting machine above straw walkers.
Figure 5:
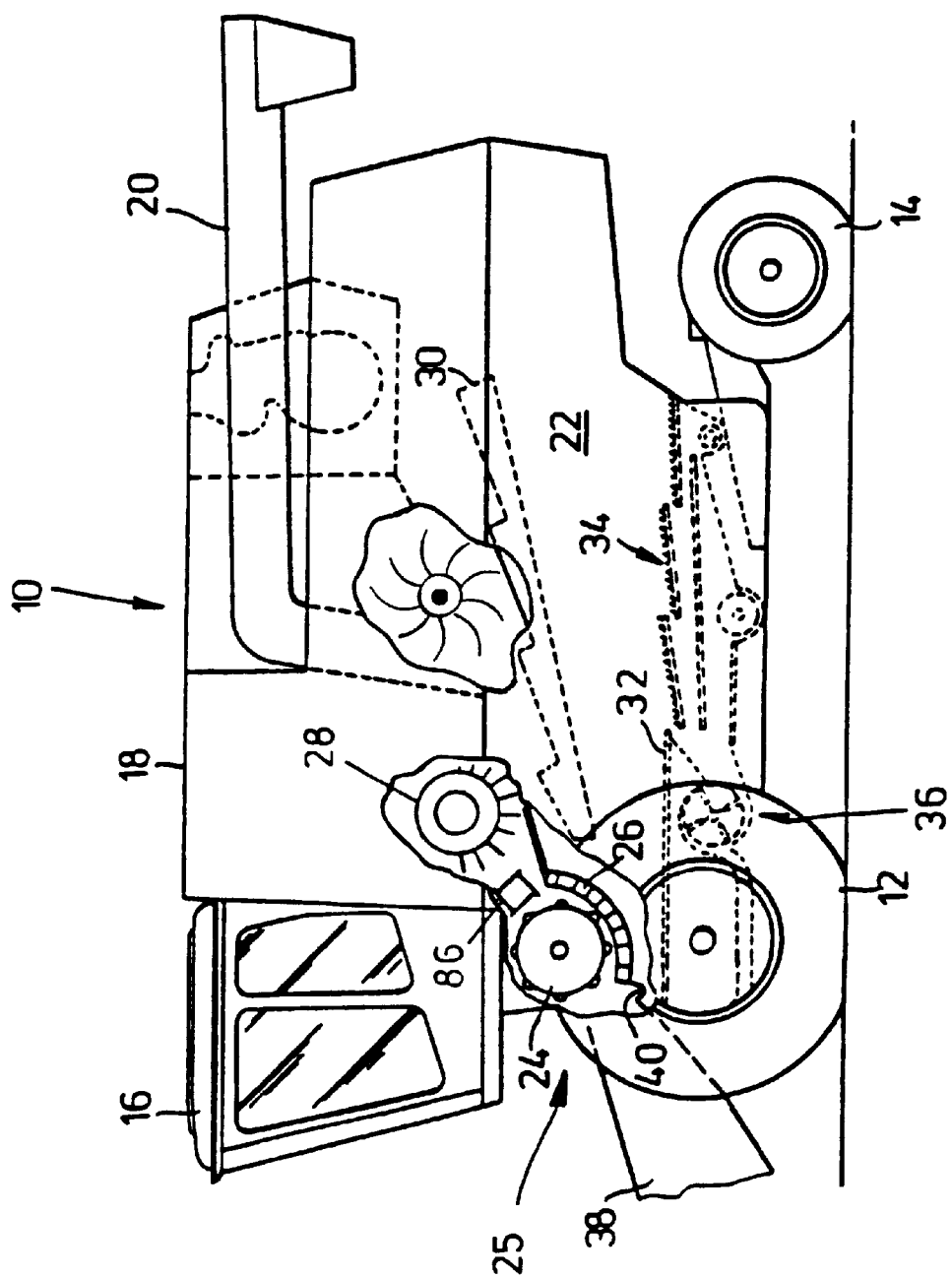
FIG. 5 shows the crop processing arrangement installed in the harvesting machine immediately downstream from the beater.
Figure 6:
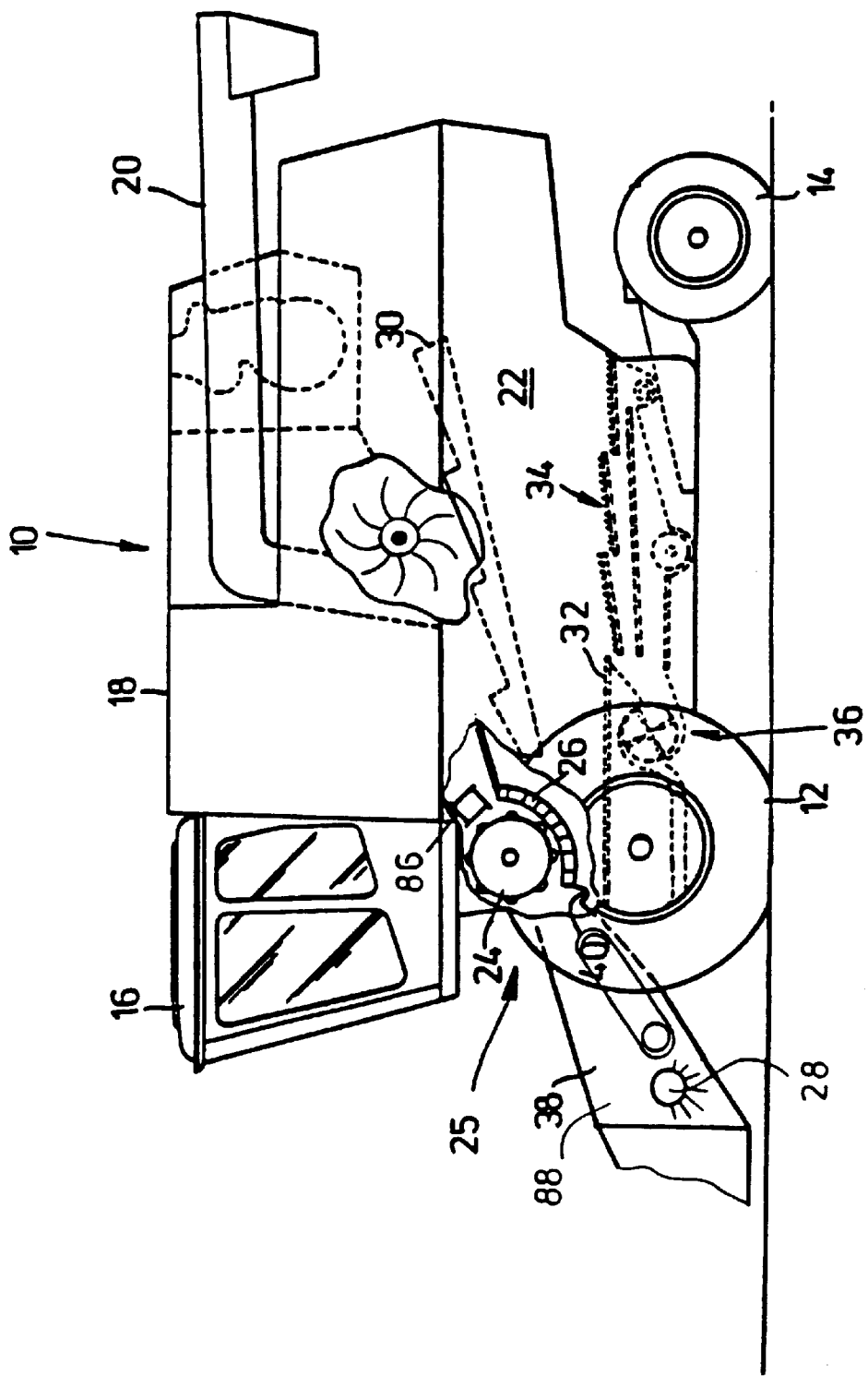
FIG. 6 shows the crop processing arrangement installed in a feederhouse of a harvesting machine.

The FIGS. 4 through 6 show three of many possible further applications of the crop processing arrangement 28 according to the invention.

Accordingly in FIG. 4 the crop processing arrangement 28 is located above the straw walkers 30 and can shake up or move sideways the crop conveyed on it.

In FIG. 5 the crop processing arrangement 28 is located immediately downstream of a beater 86 of the harvesting machine 10 and operates on the crop at this early point in the manner described. In the illustration according to FIG. 1 the crop processing arrangement 28 replaces a conventional beater.

The particular function of the crop processing arrangement 28 downstream of the beater 86 and ahead of the straw walkers 30 or in their intake region can be seen in the fact that the crop is securely removed from the beater 86 and no longer rotates with it, which helps to avoid entanglements. In addition the separation process of the remaining kernels from a straw mat is initiated in the intake region of the straw walkers 30, so that a uniform distribution and loosening is highly profitable. With the claimed arrangement of the crop processing arrangement 28 relative to the beater 86 or their arrangement in sequence reference can be made to the most varied boundary conditions.

FIG. 6 shows the crop processing arrangement 28 in the intake region of a feederhouse 38, that is, at a location at which the crop is gathered and introduced into the harvesting machine itself by a cutter head, a pick-up, a corn picker or the like. The tines 46 of the rotor housing 42 that rotate as an overshot or an undershot conveyor grasp the crop securely so that the crop does not jam. In addition, at a correspondingly inclined position of the tines 46, a sideways movement of the crop and/or a loosening of the crop is achieved.

The crop processing arrangement 28 can also be applied at an earlier point in the intake screw conveyor of a cutter head or of a pick-up or the like, where it has less effect on the composition of the crop, than that it relocates the crop sideways, in order, for example, to counteract an unequal distribution due to operation on a slope.

The invention should not be limited to the above described embodiments, but should be limited solely to the claims that follow.

I claim:

1. A crop processing arrangement (28) comprising a rotor housing (42) having a transverse axis, an eccentric axle (44) is rotatively supported in the rotor housing, the eccentric axle (44) having an axle axis that is parallel to the transverse axis of the rotor housing (42), and tines (46) are rotatively supported on the eccentric axle (44) and projecting through the rotor housing (42), and further comprising a control arrangement (48) for changing the transverse inclination of the tines relative to the rotor housing (42), and fixing the eccentric axle (44) in differing selected axial positions relative to the rotor housing (42).

2. A crop processing arrangement according to claim 1, characterized by the fact that it can be driven and arranged as an undershot conveyor.

3. A crop processing arrangement according to claim 1, characterized by the fact that it can be driven and arranged as an overshot conveyor.

4. A crop processing arrangement according to claim 1, characterized by the tines (46) that are arranged in several radial planes which intersect the eccentric axle (44), where the tines (46) in successive planes exhibit differing transverse inclinations to the eccentric axle (44).

5. A crop processing arrangement according to claim 4, characterized by the tines (46) whose position can be varied in the radial direction.

6. A crop processing arrangement according to claim 4, characterized by the tines (46) whose position can be varied in the circumferential direction.

7. Crop processing arrangement according claim 1, characterized by the eccentric axle (44) comprises of two angle levers (64 and 66), where a section (74) of the one angle lever (66) is supported in bearings in a sleeve (68) of the other angle lever (64) so as to be free to move axially relative to the other angle lever.

8. Crop processing arrangement according to claim 1, characterized by the eccentric axle (44) is configured as a one-piece component and can move axially in the rotor housing (42).

9. Crop processing arrangement according to claim 1, characterized by the eccentric axle (44) whose position can be varied by means of a control arrangement (48).

10. A crop processing arrangement for a combine having a feederhouse for directing harvested crop to a threshing assembly for threshing the harvested crop, the threshing assembly directing the harvested crop to straw walkers, the crop processing arrangement comprising a rotor housing (42) having a transverse axis;

an eccentric axle (44) is rotatively supported in the rotor housing, the eccentric axle (44) having an axle axis that is parallel to the transverse axis of the rotor housing (42); and tines (46) are rotatively supported on the eccentric axle (44) and projecting through the rotor housing (42), and further comprising a control arrangement (48) for changing the transverse inclination of the tines relative to the rotor housing (42), and fixing the eccentric axle (44) in differing selected axial positions relative to the rotor housing (42).

11. Crop processing arrangement according to claim 10, wherein the crop processing arrangement is located above the straw walkers.

12. Crop processing arrangement according to claim 10, wherein the crop processing arrangement is positioned between the threshing assembly and the straw walkers.

13. Crop processing arrangement according to claim 10, wherein a beater is located immediately downstream from the threshing assembly, the rotor housing (42) of the crop processing arrangement is positioned so that the tines (46) engage the threshed harvested crop delivered by the beater (86) from the threshing assembly.

14. Crop processing arrangement according to claim 10, wherein the crop processing arrangement is located immediately downstream from the threshing assembly.

15. Crop processing arrangement according to claim 10, wherein the crop processing arrangement is located in the feederhouse (88).

\* \* \* \* \*